(No Model.)
C. G. LUDLOW.
FUSIBLE PLUG.
No. 523,437. Patented July 24, 1894.
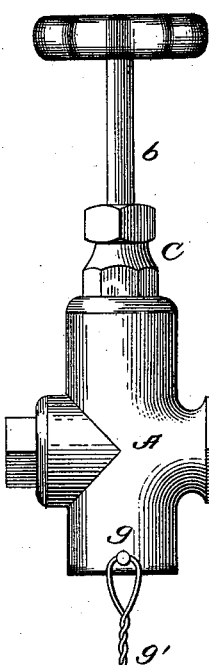
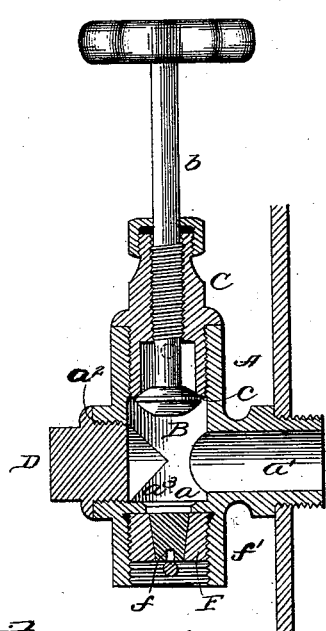
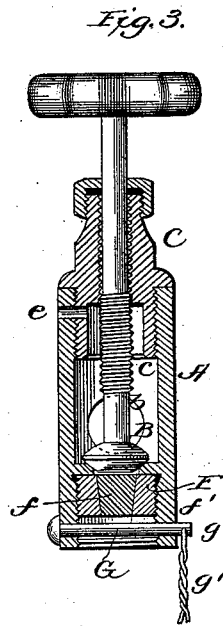
Witnesses:
Harry T. Rohrer.
John C. Wood.
Inventor:
Charles G. Ludlow,
By W. H. Singleton,
Atty.
THE NORRIS PETERS CO., PHOTO-LITHO., WASHINGTON, D. C.

UNITED STATES PATENT OFFICE.

CHARLES G. LUDLOW, OF CHICAGO, ILLINOIS, ASSIGNOR TO THE CROSBY STEAM GAGE AND VALVE COMPANY, OF BOSTON, MASSACHUSETTS.

FUSIBLE PLUG.

SPECIFICATION forming part of Letters Patent No. 523,437, dated July 24, 1894.

Application filed June 28, 1893. Serial No. 479,053. (No model.)

*To all whom it may concern:*

Be it known that I, CHARLES G. LUDLOW, a citizen of the United States, residing at Chicago, in the county of Cook and State of Illinois, have invented certain new and useful Improvements in Fusible Plugs; and I do hereby declare the following to be a full, clear, and exact description of the invention, such as will enable others skilled in the art to which it appertains to make and use the same.

This invention relates to an improvement in fusible plugs to be attached to engine boilers.

The object of this device is to permit inspectors to determine or be kept informed of the melting of a fusible plug in a boiler at any time.

When the device is attached to a steam boiler for use, the valve is screwed back so that it is seated against the neck of the valve, thus allowing free passage of the steam to the fusible plug at the opposite end, giving in this way as complete freedom for the action of heat upon it as in any other position it may be attached to the boiler. In case an accident occurs by the falling of the water below where it is attached to the boiler so that the heat of the flame melts the fusible plug, then the attendant can screw in the valve until it seats upon the diaphragm, thus shutting off the device so that, upon introduction of water, there will be no leakage except what may come through the small hole or passage near the stem of the valves, which, when the valve is thus closed, permits the water or steam to pass through it, thereby constantly warning the attendant of the want of a fusible plug required by the inspection laws; a sort of telltale to any one who may know its use.

In the annexed drawings: Figure 1 is a side view of the device shown attached to a portion of a boiler. Fig. 2 is a vertical section of Fig. 1 taken through the boiler, and Fig. 3 is a vertical section at a right angle to Fig. 2.

In the drawings: the letter A indicates a valve body. This valve body has the valve, B, with its valve stem $b$. The stuffing box, C, has one seat, $c$, for the valve, B, and the diaphragm, $a$, of the body, A, forms another seat for the valve, thus forming a double-seated valve. The body, A, also has a hollow stem, $a'$, for connection with the boiler, and opposite to this an opening, $a^2$, which is closed by a plug, D. In the valve body, A, there is a hole or passage, $e$, which passes through the stuffing box, C, and opens into the interior of the body, A, above the valve, B. In the valve seat, $a$, there is also an opening, $a^3$, which is closed by the plug, F, having the fusible center, $f$, which is screwed into the projection, $f'$, of the valve body, A. Below this fusible plug, F, a pin, G, passes through the projection, $f'$, and to its headless end, $g$, is to be attached the seal, $g'$. This valve body is to be attached as already explained, and by removing the plug, D, an instrument may be inserted to clean away any foreign matter which may become lodged where it is attached to the boiler.

Having described my invention, what I claim is—

1. The valve provided with a hollow stem communicating with its interior; two valve seats and passages leading through such seats to the outside of the valve body, in combination with a fusible plug closing one of such passages, and a valve contained within such body and adapted to both valve seats, as set forth.

2. The valve body provided with a hollow stem communicating with its interior, the two valve seats, $a$ and $c$, passages leading outwardly from such seats, and the hole or passage, $e$, leading from the outside of the valve body into the passage beyond the seat, $c$, in combination with the fusible plug, D, in the passage beyond the seat, $a$; and the valve, B, between the valve seats, as set forth.

In testimony whereof I affix my signature in presence of two witnesses.

CHARLES G. LUDLOW.

Witnesses:
 ARTHUR D. SEATON,
 CHARLES U. GORDON.